(12) United States Patent
Arimatsu et al.

(10) Patent No.: US 9,862,509 B2
(45) Date of Patent: Jan. 9, 2018

(54) BOXING APPARATUS

(75) Inventors: Tatsuya Arimatsu, Ritto (JP); Seisaku Iwasa, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 750 days.

(21) Appl. No.: 14/122,934

(22) PCT Filed: Jun. 1, 2012

(86) PCT No.: PCT/JP2012/064327
§ 371 (c)(1),
(2), (4) Date: Nov. 27, 2013

(87) PCT Pub. No.: WO2012/165632
PCT Pub. Date: Dec. 6, 2012

(65) Prior Publication Data
US 2014/0083062 A1 Mar. 27, 2014

(30) Foreign Application Priority Data

Jun. 2, 2011 (JP) .................................. 2011-124109

(51) Int. Cl.
*B65B 5/02* (2006.01)
*B65B 5/06* (2006.01)
(Continued)

(52) U.S. Cl.
CPC ................. *B65B 5/024* (2013.01); *B65B 5/06* (2013.01); *B65B 35/44* (2013.01); *B65B 35/56* (2013.01);
(Continued)

(58) Field of Classification Search
CPC ........... B65B 5/06; B65B 35/44; B65B 35/56; B65B 35/50; B65B 35/58; B65B 35/40;
(Continued)

(56) References Cited

U.S. PATENT DOCUMENTS 1,581,583 A * 4/1926 Low ....................... B65H 31/28
271/184
2,904,944 A * 9/1959 Notredame ............... B65B 5/06
53/247
(Continued)

FOREIGN PATENT DOCUMENTS

DE  3301477 A1  7/1983
EP  2218646 A1  8/2010
(Continued)

OTHER PUBLICATIONS

Extended European Search Report of the corresponding European Patent Application No. 12793849.6, dated Oct. 2, 2014.

*Primary Examiner* — Hemant M Desai
*Assistant Examiner* — Eduardo R Ferrero
(74) *Attorney, Agent, or Firm* — Global IP Counselors, LLP

(57) ABSTRACT

A boxing apparatus erects packages that can be erected along a limited section of a conveyor, without having to erect them all at once, even with individual packages that are long in the feed direction. The boxing apparatus has a fourth conveyor belt that blocks the front of a line of incoming packages and exerts an upward force on the front package. The front package is raised up by this upward force, so the following package rides up onto the package in front, and the packages are erected successively. Consequently, even individual packages that are long in the feed direction can be erected at a limited section of a third conveyor belt.

13 Claims, 14 Drawing Sheets

(51) Int. Cl.
*B65B 35/44* (2006.01)
*B65B 35/56* (2006.01)
*B65G 47/32* (2006.01)
*B65G 47/26* (2006.01)
*B65G 47/08* (2006.01)
*B65G 47/252* (2006.01)
*B65G 47/14* (2006.01)
*B65G 47/29* (2006.01)
*B65G 47/24* (2006.01)

(52) U.S. Cl.
CPC ........ *B65G 47/082* (2013.01); *B65G 47/1492* (2013.01); *B65G 47/24* (2013.01); *B65G 47/252* (2013.01); *B65G 47/265* (2013.01); *B65G 47/266* (2013.01); *B65G 47/29* (2013.01); *B65G 47/32* (2013.01)

(58) Field of Classification Search
CPC ...... B65G 47/24; B65G 47/266; B65G 47/29; B65G 47/34; B65G 47/22; B65G 47/5181; B65G 47/30; B65G 21/10; B65G 21/12; B65G 57/11; B65G 57/28; B65G 57/32; B65G 15/14; B65G 7/08; B65G 47/265; B65G 17/16; B65G 19/225; B65G 47/08; B65G 47/082; B65G 47/1492; B65G 47/252; B65G 47/26; B65G 47/32
USPC ......... 53/542, 473, 152, 532, 534, 241, 248, 53/251, 565, 566; 198/311, 343.1, 345.1, 198/432, 632, 861.5, 414, 416, 418, 19.1, 198/431
See application file for complete search history.

(56) References Cited

U.S. PATENT DOCUMENTS

| | | | | |
|---|---|---|---|---|
| 2,945,335 A * | 7/1960 | Nicolle | ................... | B65B 35/56 193/46 |
| 3,228,538 A * | 1/1966 | Coates | ................... | A21C 15/00 198/418.6 |
| 3,421,283 A * | 1/1969 | Schieser | ................... | B65B 5/06 53/247 |
| 3,648,431 A * | 3/1972 | Hartbauer | ............... | B65B 27/08 493/386 |
| 3,811,549 A * | 5/1974 | Preisig | ................. | B65G 47/082 198/419.2 |
| 3,974,921 A * | 8/1976 | Tokuno | ................. | B65G 57/28 198/374 |
| 4,086,745 A * | 5/1978 | Caudle | ................. | B65B 35/50 53/540 |
| 4,141,193 A * | 2/1979 | Joa | ........................ | B65B 25/20 198/408 |
| 4,170,285 A * | 10/1979 | Hinchcliffe | ............... | A24C 5/35 198/347.3 |
| 4,176,993 A * | 12/1979 | Luginbuhl | ............ | B65G 57/32 198/441 |
| 4,374,559 A * | 2/1983 | Morton | ................... | B65B 23/12 198/429 |
| 4,398,383 A * | 8/1983 | Prakken | ................. | B65B 5/061 53/247 |
| 4,492,070 A * | 1/1985 | Morse | ................... | B65B 35/50 53/438 |
| 4,531,343 A * | 7/1985 | Wood | ................... | B65B 27/08 271/151 |
| 4,718,534 A * | 1/1988 | Harper | ................. | B65G 57/32 148/431 |
| 4,765,487 A * | 8/1988 | Bliss | ..................... | B65G 57/24 209/510 |
| 4,768,328 A * | 9/1988 | Mims | ..................... | B65B 5/068 53/532 |
| 4,796,409 A * | 1/1989 | Rimmer | ................. | B26D 1/205 53/435 |
| 4,864,801 A | 9/1989 | Fallas | | |
| 4,993,916 A * | 2/1991 | Dorner | ................. | B65G 47/082 198/468.11 |
| 5,095,684 A * | 3/1992 | Walker | ................... | B65B 57/12 198/462.2 |
| 5,427,226 A * | 6/1995 | Ueda | ................... | B65G 47/082 198/418.6 |
| 5,435,433 A * | 7/1995 | Jordan | ................... | B65G 15/14 198/626.3 |
| 5,495,932 A * | 3/1996 | Dyess | ................... | B65G 47/252 198/416 |
| 5,538,392 A * | 7/1996 | Leifeld | .................... | D01G 7/06 198/345.1 |
| 5,662,454 A * | 9/1997 | Baufreton | ............... | B07C 1/025 271/2 |
| 5,692,362 A * | 12/1997 | Hoyland | ............... | B65B 35/243 53/252 |
| 5,779,432 A * | 7/1998 | Pena | ..................... | B65G 57/11 198/418.6 |
| 5,873,448 A * | 2/1999 | Tsai | ........................ | B65B 57/20 198/360 |
| 6,241,458 B1 * | 6/2001 | Berndl | ................... | B65G 57/11 414/790.3 |
| 6,336,308 B1 * | 1/2002 | Kokkersvold | ............ | B66C 1/18 493/226 |
| 6,508,352 B1 * | 1/2003 | Enenkel | ................... | B07C 3/008 198/419.1 |
| 6,622,848 B1 | 9/2003 | Lattimer et al. | | |
| 6,834,755 B2 * | 12/2004 | Jay | ........................ | B65B 23/14 198/418.6 |
| 6,840,369 B2 * | 1/2005 | Derenthal | ............... | B65B 23/14 198/418.6 |
| 6,854,588 B1 * | 2/2005 | Blattner | ................. | B65B 47/78 198/418.6 |
| 6,971,839 B2 * | 12/2005 | Cerutti | ................... | B65B 23/14 198/418.6 |
| 7,021,450 B2 * | 4/2006 | Jones, Jr. | ............... | B65G 21/14 198/418.9 |
| 7,080,968 B2 * | 7/2006 | Blackwell | ............. | B65H 29/34 198/418.6 |
| 7,220,094 B2 * | 5/2007 | Cerutti | ................... | B65B 23/14 198/430 |
| 7,475,768 B2 * | 1/2009 | Takaoka | ................. | B65B 5/061 198/407 |
| 7,721,509 B2 * | 5/2010 | Vissers | ..................... | B65B 5/06 53/252 |
| 7,862,020 B2 * | 1/2011 | Haller | ................... | B65H 29/66 270/52.01 |
| 7,921,982 B2 * | 4/2011 | Moske | ................... | B65B 5/061 198/406 |
| 8,015,781 B2 * | 9/2011 | Kent | ..................... | B65B 5/108 53/245 |
| 8,307,614 B1 * | 11/2012 | Louie | ..................... | B65H 29/46 53/443 |
| 2006/0283150 A1 * | 12/2006 | Hart | ........................ | B65B 5/10 53/447 |
| 2010/0146909 A1 * | 6/2010 | Malenke | ................. | B65B 5/101 53/447 |
| 2010/0170196 A1 * | 7/2010 | Iwasa | ..................... | B65B 5/061 53/391 |

FOREIGN PATENT DOCUMENTS

| | | |
|---|---|---|
| GB | 2306450 A | 5/1997 |
| JP | 2010-189015 A | 9/2010 |
| JP | 2011-246156 A | 12/2011 |
| WO | 2009-015259 A2 | 1/2009 |

* cited by examiner

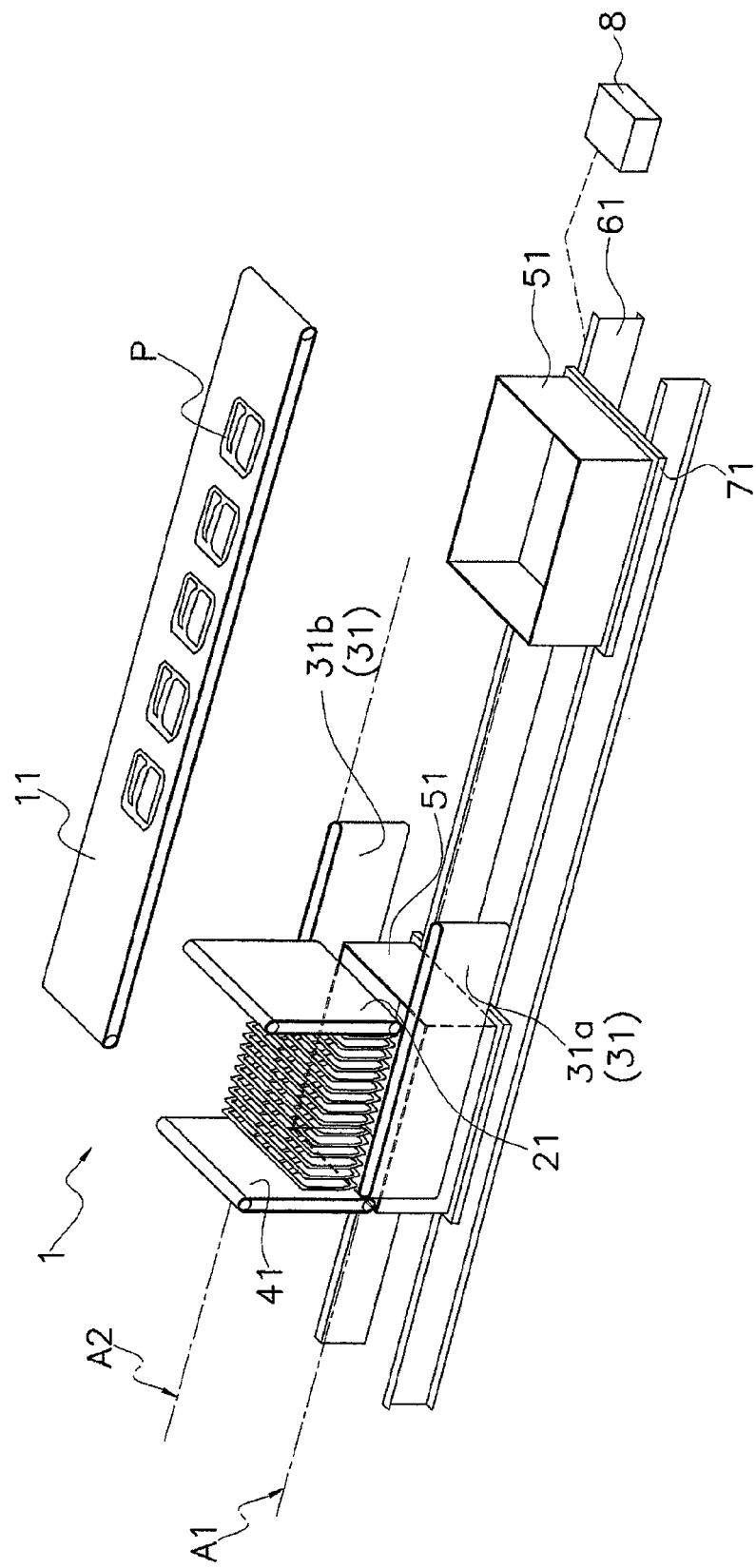
F I G. 5

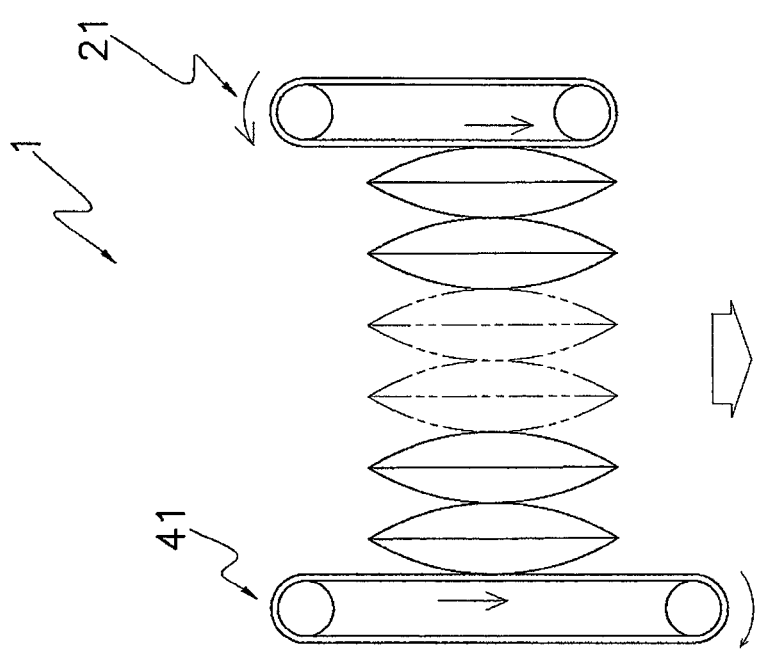
F I G. 6

BOXING APPARATUS

CROSS-REFERENCE TO RELATED APPLICATIONS

This U.S. National stage application claims priority under 35 U.S.C. §119(a) to Japanese Patent Application No. 2011-124109, filed in Japan on Jun. 2, 2011, the entire contents of which are hereby incorporated herein by reference.

FIELD OF THE INVENTION

The present invention relates to a boxing apparatus.

DESCRIPTION OF THE RELATED ART

Boxing apparatuses that arrange a plurality of packages in an erect state and then put them all at once into a box have become popular in recent years. For example, with the boxing apparatus disclosed in Japanese Laid-Open Patent Application 2010-189015, when the first in a line of moving packages reaches a specific position, a first plate member that rises perpendicularly is placed against the last in the line, a second plate member under the front of the line is erected vertically to erect all the packages at once, and then the whole line of erected packages is conveyed to a box.

SUMMARY OF THE INVENTION

However, with a boxing apparatus designed as above, if the individual packages are long in the conveyance direction, for example, the line of packages waiting to be erected becomes longer. This means that there is a longer distance between the first plate member and the second plate member, and the length occupied by the conveyor increases by a corresponding amount. This adversely affects productivity.

It is an object of the present invention to provide a boxing apparatus with which packages can be erected at a limited section of a conveyor, without having to erect them all at once, even with individual packages that are long in the feed direction.

The boxing apparatus according to a first aspect of the present invention is a boxing apparatus that makes a line of packages by arranging a plurality of packages so that adjacent packages partially overlap each other, conveys this line with a conveyance means, and collects a specific quantity of the packages and puts them in a specific box, said boxing apparatus comprising erecting means. The erecting means blocks the front of the incoming line and exerts an upward force on the packages.

With this boxing apparatus, since the front package rises under an upward force, the following package rides up onto the package ahead, and the packages rise up successively. Consequently, packages can be erected at a limited section of the conveyance means, without having to erect them all at once, even with individual packages that are long in the feed direction.

The boxing apparatus according to a second aspect of the present invention is the boxing apparatus pertaining to the first aspect, wherein the erecting means erects the package at the front until its angle to the horizontal plane is greater than that of the following package.

With this boxing apparatus, the second package is the line conforms to the erect state of the erected front package while riding up onto the erected front package, and subsequent packages also rise up one after the other on the package immediately ahead under the same operation, so all of the other packages conform to the erect state of the front package. Here, the line will be disrupted if the erect state of the front package is at an angle such that following packages ride up and over the packages ahead. Consequently, disruption of the line is prevented by erecting the front package to a state in which its angle to the horizontal plane is greater than that of the following packages (such as putting the front package in a vertical orientation).

The boxing apparatus according to a third aspect of the present invention is the boxing apparatus pertaining to the first aspect, wherein the conveyance means continues operating even after the front package has been erected.

With this boxing apparatus, since the conveyance means continues operating even after the front package has been erected, the following packages try to ride up onto the packages ahead, and this becomes an upward force that acts on the packages, and the packages are successively erected.

The boxing apparatus according to a fourth aspect of the present invention is the boxing apparatus pertaining to the third aspect, further comprising holding means and relocation means. The holding means presses the last package in the line in the direction of the front of the line. The relocation means moves the conveyance means to another position that is away from the line. The holding means holds a group of packages from the front to the last in an erect state along with the erecting means, and pushes the group of packages downward after the conveyance means has moved to the other position.

With this boxing apparatus, for example, a box is disposed under the line of packages, and a group of packages is pushed downward after the conveyance means has moved to another position, which completes the putting of the packages in the box. With this configuration, there is no need for the holding means to sandwich and move a group of packages along with the erecting means, so the line is not disrupted during movement, and the packages are smoothly put into the box.

The boxing apparatus according to a fifth aspect of the present invention is the boxing apparatus pertaining to any of the first to fourth aspects, wherein the erecting means is a vertical conveyor whose surface in contact with the packages moves in the vertical direction.

With this boxing apparatus, the structure is simpler since an upward force can be obtained by bringing the package at the front of the line into contact with the surface of the vertical conveyor.

The boxing apparatus according to a sixth aspect of the present invention is the boxing apparatus pertaining to the fifth aspect, wherein the conveyance means is a horizontal conveyor whose conveyance surface on which the packages are placed moves in the horizontal direction. The lower end of the vertical conveyor is disposed beneath the conveyance surface of the horizontal conveyor.

With this boxing apparatus, because the lower end of the vertical conveyor is disposed beneath the conveyance surface of the horizontal conveyor, there is no gap in the vertical direction between the horizontal conveyor and the vertical conveyor, so even if the package at the front of the line is lying down horizontally, the front package will be prevented from being squeezed between the horizontal conveyor and the vertical conveyor.

The boxing apparatus according to a seventh aspect of the present invention is the boxing apparatus pertaining to the fourth aspect, wherein the erecting means and the holding means are a vertical conveyor whose surface in contact with the packages moves in the vertical direction. When the erecting means and the holding means push the group of packages downward, the surfaces in contact with the packages move downward.

With this boxing apparatus, when the group of packages is pushed downward, the surfaces of the erecting means and the holding means in contact with the packages move downward, and this prevents just the first and last packages from moving downward later than the other packages.

The boxing apparatus according to an eighth aspect of the present invention is the boxing apparatus pertaining to the first aspect, wherein the erecting means has an erecting member. The erecting member moves along the conveyance path of the packages in the opposite direction from the conveyance direction of the packages.

With this boxing apparatus, since the erecting member pushes the incoming group of packages back in the opposite direction from the direction in which the packages are being conveyed, the packages in the group are erected substantially simultaneously, which makes it easier to put them in the box.

The boxing apparatus according to a ninth aspect of the present invention is the boxing apparatus pertaining to the eighth aspect, wherein the erecting means further has an opening and closing member. The opening and closing member opens and closes the upstream side of the conveyance path when the erecting member moves along the conveyance path of the packages.

With this boxing apparatus, since the erecting member and the opening and closing member sandwich the group of packages, all of the packages in the group are erected substantially simultaneously.

The boxing apparatus according to a tenth aspect of the present invention is the boxing apparatus pertaining to the ninth aspect, further comprising a controller that controls the erecting means. The erecting member of the erecting means is a vertical conveyor whose surface in contact with the packages moves in the vertical direction. The controller predicts the point when the leading edge of the front package will hit the conveyance surface of the vertical conveyor, and moves the conveyance surface of the vertical conveyor upward for a specific duration that includes this point in time.

With this boxing apparatus, since the point when the leading edge of the front package will hit the conveyance surface of the vertical conveyor can be predicted, the conveyance surface of the vertical conveyor can be moved upward only when needed and only for the necessary duration in order to erect the front package.

The boxing apparatus according to an eleventh aspect of the present invention is the boxing apparatus pertaining to the tenth aspect, wherein the controller varies the specific duration according to the orientation of the packages when put in the box.

With this boxing apparatus, the orientation of the package when the package is moved on the conveyance surface, that is, whether the lengthwise direction of the package is parallel or perpendicular to the conveyance direction, is determined according to the orientation when the packages are put in the box. The point when the leading edge of the front package will hit the conveyance surface of the vertical conveyor depends on whether the lengthwise direction of the package is parallel or perpendicular to the conveyance direction. The controller can vary the specific duration during which the conveyance surface of the vertical conveyor is moved upward according to the orientation of the packages when put in the box, so the front package can be reliably erected.

The boxing apparatus according to a twelfth aspect of the present invention is the boxing apparatus pertaining to the ninth aspect, wherein the erecting means is disposed on a horizontal conveyance surface that conveys the packages from the opening and closing member side toward the erecting member. The erecting means further has a blocking member. The blocking member blocks off a gap formed by the erecting member and the horizontal conveyance surface.

With this boxing apparatus, if there were no blocking member, there would be the possibility that the leading edge of the front package would go into a gap formed by the erecting member and the horizontal conveyance surface, rendering the apparatus inoperable, in a state in which the leading edge is tilted downward, or when a package whose leading edge is low in height to start with is conveyed. However, at least the leading edge of the package can be prevented from going into the gap by blocking off the gap with the blocking member.

With the boxing apparatus of the present invention, since the front package is erected under an upward force, following packages are successively erected while riding up onto the package ahead. Therefore, packages can be erected at a limited section of a conveyance means, without having to erect them all at once, even with individual packages that are long in the feed direction.

BRIEF DESCRIPTION OF DRAWINGS

FIG. 5 is an oblique view of the boxing apparatus when a third conveyor belt has opened vertically downward;

FIG. 6 is a side view of the boxing apparatus when the third conveyor belt has moved away from below the packages;

DETAILED DESCRIPTION OF THE INVENTION

Embodiments of the present invention will now be described through reference to the drawings. The following embodiments are specific examples of the present invention, and do not limit the technological scope of the present invention.

Figure 1:
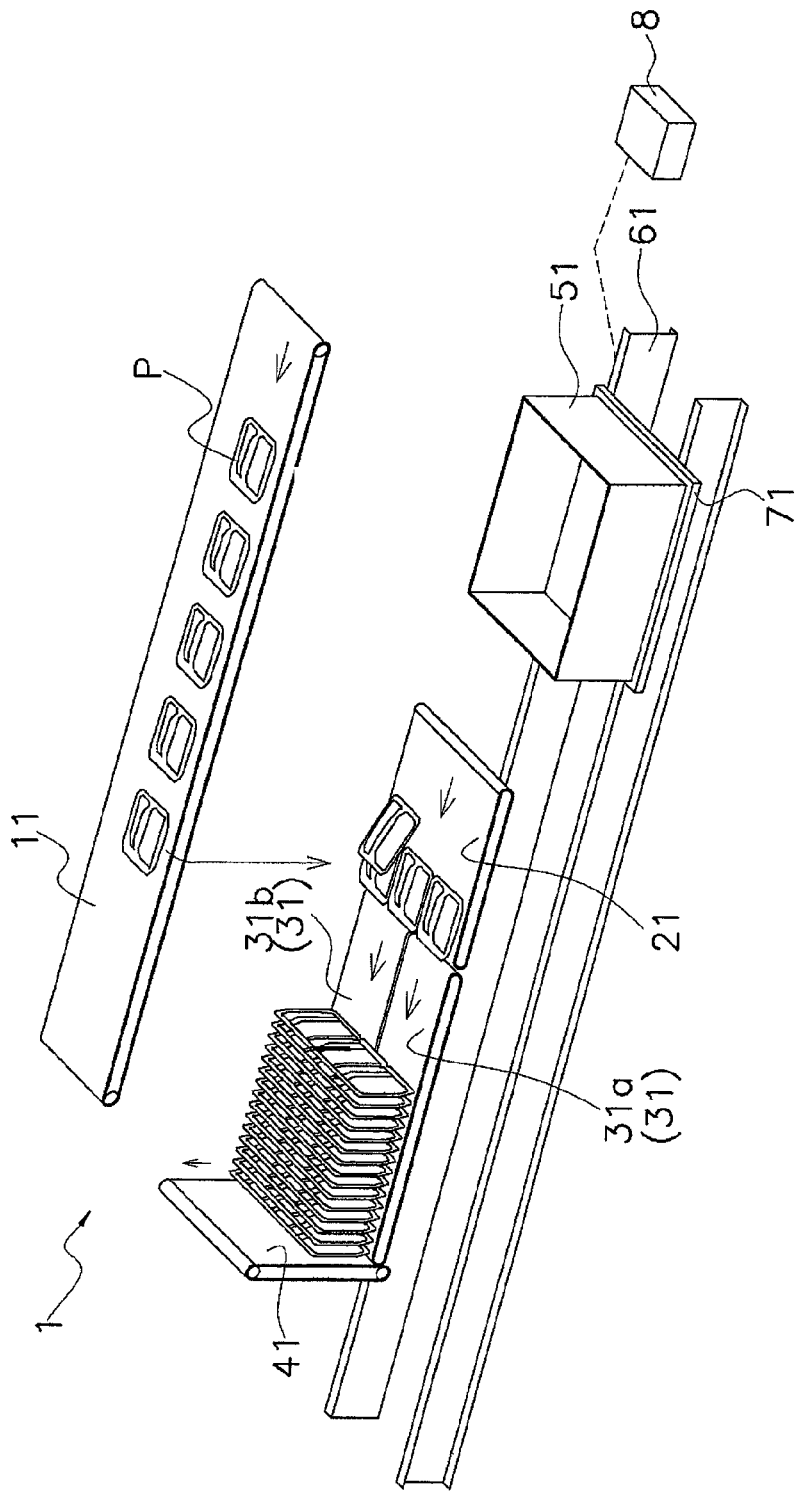
FIG. 1 is an oblique view of the boxing apparatus pertaining to a first embodiment of the present invention.

First Embodiment (1) Simplified Configuration of Boxing Apparatus 1 FIG. 1 is an oblique view of the boxing apparatus 1 pertaining to the first embodiment of the present invention. In FIG. 1, the boxing apparatus 1 comprises a first conveyor belt 11, a second conveyor belt 21, a third conveyor belt 31, and a fourth conveyor belt 41.

Rails 61 are installed directly below the second conveyor belt 21 and the third conveyor belt 31 and serve as a path that conveys a box 51. A table 71 is movably disposed on the rails 61, and the box 51 is placed on the table 71 and moves over the rails 61.

(2) Detailed Configuration (2-1) First Conveyor Belt 11

The first conveyor belt 11 is a horizontal conveyor belt, and is disposed diagonally above the second conveyor belt 21. Packages P that are conveyed in by the first conveyor belt 11 are, for example, pouch-shaped packages P filled with a specific weight of confectionery, and are arranged on the conveyance surface of the second conveyor belt 21 by an industrial robot arm (not shown). The packages P are arranged so that adjacent ones partially overlap each other, and the packages P move in a line over the conveyance surface of the second conveyor belt 21. The first conveyor belt 11 defines a package feeding conveyor.

(2-2) Second Conveyor Belt 21

Figure 3:
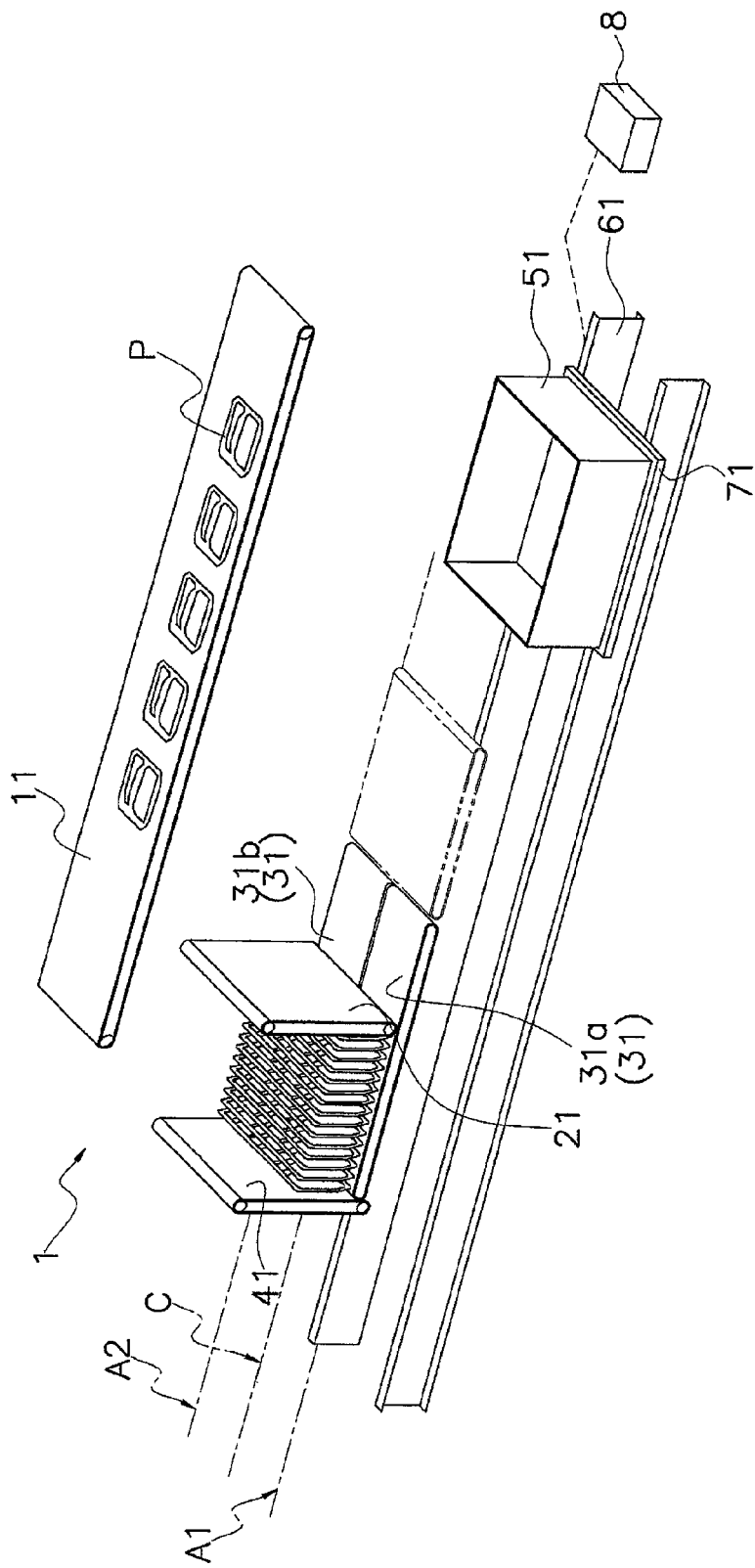
FIG. 3 is an oblique view of the boxing apparatus after all the packages in the line have been erected.
Figure 4:
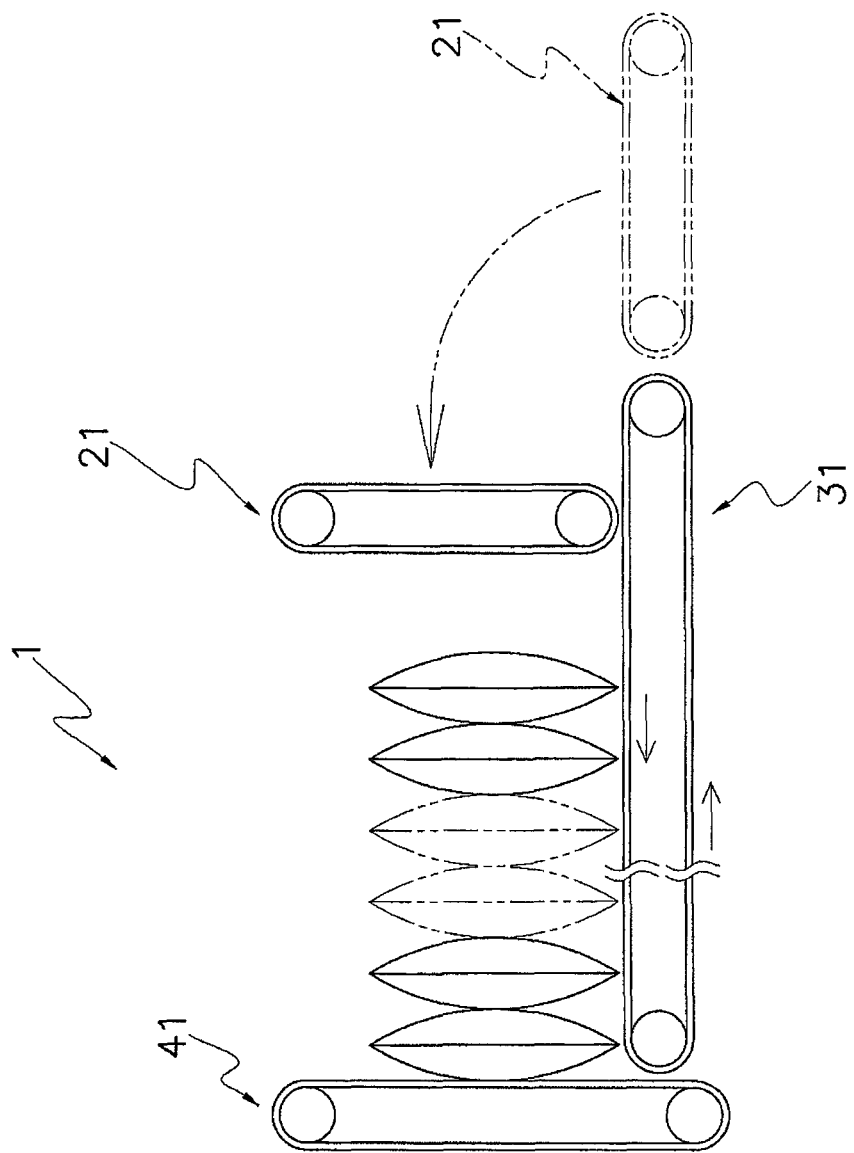
FIG. 4 is a side view of the boxing apparatus when a second conveyor belt changes from horizontal orientation to vertical orientation.

The second conveyor belt 21 is configured so that its position and orientation can be changed, and its orientation can be switched from horizontal to vertical as indicated if FIGS. 3 and 4. In its horizontal orientation, the second conveyor belt 21 conveys the line of packages P to the third conveyor belt 31. The second conveyor belt 21 defines a compressing device.

(2-3) Third Conveyor Belt 31

The third conveyor belt 31 consists of two conveyor belts side by side and parallel in the lengthwise direction. A center line C is defined between the two conveyor belts that make up the third conveyor belt 31, as shown in FIG. 3. For the sake of convenience in this description, the side nearer the viewer in FIG. 1 will be referred to as conveyor belt 31a, and the far side will be referred to as conveyor belt 31b. The conveyor belt 31a and the conveyor belt 31b are configured so that the adjacent sides tilt vertically downward. The second and third conveyor belts 21 and 31 define a package arranging conveyor.

As indicated in FIGS. 1, 3 and 5, the conveyor belt 31a and the conveyor belt 31b can be tilted away from one another such that the side of the conveyor belt 31a tilts from a horizontal position (FIGS. 1 and 3) to a vertical position (FIG. 5). Similarly, the conveyor belt 31b tilts in an opposite direction from a horizontal position (FIGS. 1 and 3) to a vertical position (FIG. 5). The conveyor belt 31a tilts about a first axis $A_1$ and the conveyor belt 31b tilts about a second axis $A_2$, as shown in FIGS. 1 and 3. The method for tilting the conveyor belt 31a and the conveyor belt 31b can be, for example, to re-position the conveyor belts 31a and 31b with an air cylinder or a hydraulic cylinder (not shown). Naturally, some alternative method may be used instead.

When in horizontal orientation (FIGS. 1 and 3), the third conveyor belt 31 conveys the line of packages P conveyed in from the second conveyor belt 21 toward the fourth conveyor belt 41.

(2-4) Fourth Conveyor Belt 41

The fourth conveyor belt 41 is a vertical conveyor belt, and blocks and erects the front of the line of packages P moving in over the third conveyor belt 31. The fourth conveyor belt 41 defines an erecting conveyor or erecting device.

Figure 2:
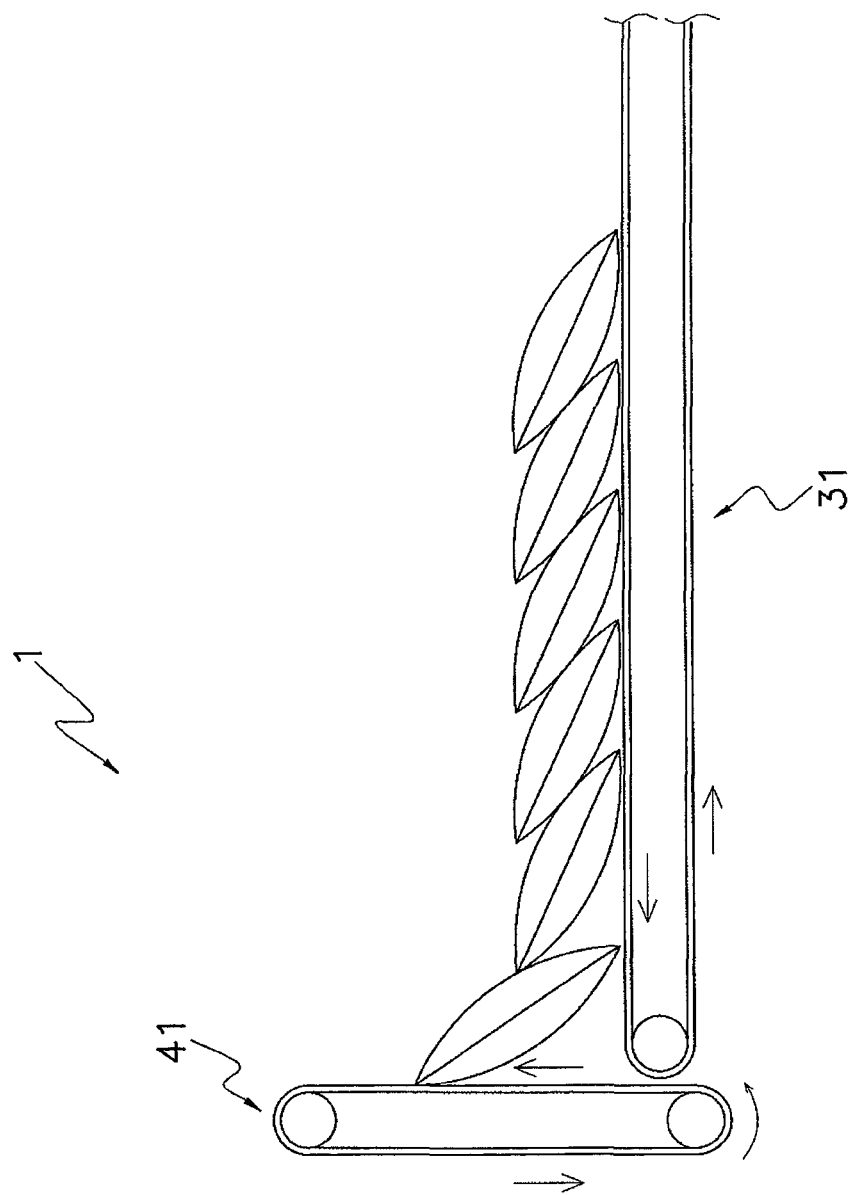
FIG. 2 is a side view of the boxing apparatus when the front package is erected.

FIG. 2 is a side view of the boxing apparatus when the front package P is erected. In FIG. 2, the conveyance surface of the fourth conveyor belt 41 that touches the packages P has moved vertically upward, and when the leading edge of the front package P comes into contact with the conveyance surface, an upward force is exerted on the leading edge, and horizontal movement by the third conveyor belt 31 continues, so the front package P reliably rises up to a erect or upright state.

Since the lower end of the fourth conveyor belt 41 is disposed lower than the conveyance surface of the third conveyor belt 31, no gap between the fourth conveyor belt 41 and the third conveyor belt 31 is formed in the vertical direction. Consequently, even if the front package P in the line is lying horizontally, the front package P will be prevented from being squeezed between the fourth conveyor belt 41 and the third conveyor belt 31.

(3) Operation of Boxing Apparatus 1

As shown in FIGS. 1 and 2, the packages P conveyed in on the first conveyor belt 11 are successively arranged on the second conveyor belt 21 so that the adjacent ones partially overlap each other as they are sent to the third conveyor belt 31. The line of packages P moves along the third conveyor belt 31 toward the fourth conveyor belt 41. When the leading edge of the front package P touches the conveyance surface of the fourth conveyor belt 41, an upward force is exerted on the leading edge, and since horizontal movement by the third conveyor belt 31 continues, the front package P can be reliably erected.

The fourth conveyor belt 41 erects the front package P to a state in which its angle to the horizontal plane is greater than that of the following package P (a substantially vertical orientation). Since the third conveyor belt 31 continues to operate even after the front package P has been erected (or put in an upright state), the second package P in the line rides up onto the erected front package P while conforming to the erect state of the front package P, the following packages P also successively become upright under the same operation on the package P immediately ahead, and all of the other packages P conform to the upright state of the front package P. Here, since the line is disrupted if the upright state of the front package P has an angle such that the following package P rides up and over the package P ahead, the front package P is erected to a state in which its angle to the horizontal plane is greater than that of the following package P (such as a vertical orientation), and this prevents disruption of the line.

FIG. 3 is an oblique view of the boxing apparatus 1 after all the packages P in the line have been erected. In FIG. 3, with the boxing apparatus 1, the second conveyor belt 21 in its vertical orientation pushes the packages P in the direction of the fourth conveyor belt 41 at the point when the last package P in the line has been erected (put in the upright state).

FIG. 4 is a side view of the boxing apparatus 1 when the second conveyor belt 21 changes from horizontal orientation to vertical orientation. In FIG. 4, the second conveyor belt 21 moves toward the last package P in the line while rotating into its vertical orientation. The packages P are in a state of being sandwiched between the second conveyor belt 21 and the fourth conveyor belt 41.

FIG. 5 is an oblique view of the boxing apparatus when the third conveyor belt 31 has opened vertically downward. In FIG. 5, since the conveyor belt 31a and conveyor belt 31b of the third conveyor belt 31 tilt in a manner similar to a revolving door opening, nothing is left to support the packages P from below. However, the line of packages P does not fall out because it is being compressed between the second conveyor belt 21 and the fourth conveyor belt 41.

Also, immediately after the conveyor belt 31a and the conveyor belt 31b of the third conveyor belt 31 have tilted to their respective vertical orientations (FIG. 5), a packaging box 51 that has been placed on the table 71 is moved along the rails 61 and stops under the third conveyor belt 31.

At this point, the second conveyor belt 21 and the fourth conveyor belt 41 are moved slightly reducing the compression force that presses the line of packages P, which allows the line of packages P, which is no longer supported, to fall under its own weight downward toward the box 51, so that the packages are put in the box 51.

Since the package P at the front of the line is in contact with the fourth conveyor belt 41, and the package P at the end of the line is in contact with the second conveyor belt 21, there is a tendency for these two packages to fall later than the packages P in the middle, which tends to disrupt the orientation of the packages P. Consequently, the second conveyor belt 21 and the fourth conveyor belt 41 are rotated to move the first and last packages downward as shown in FIGS. 6 and 7.

Figure 7:
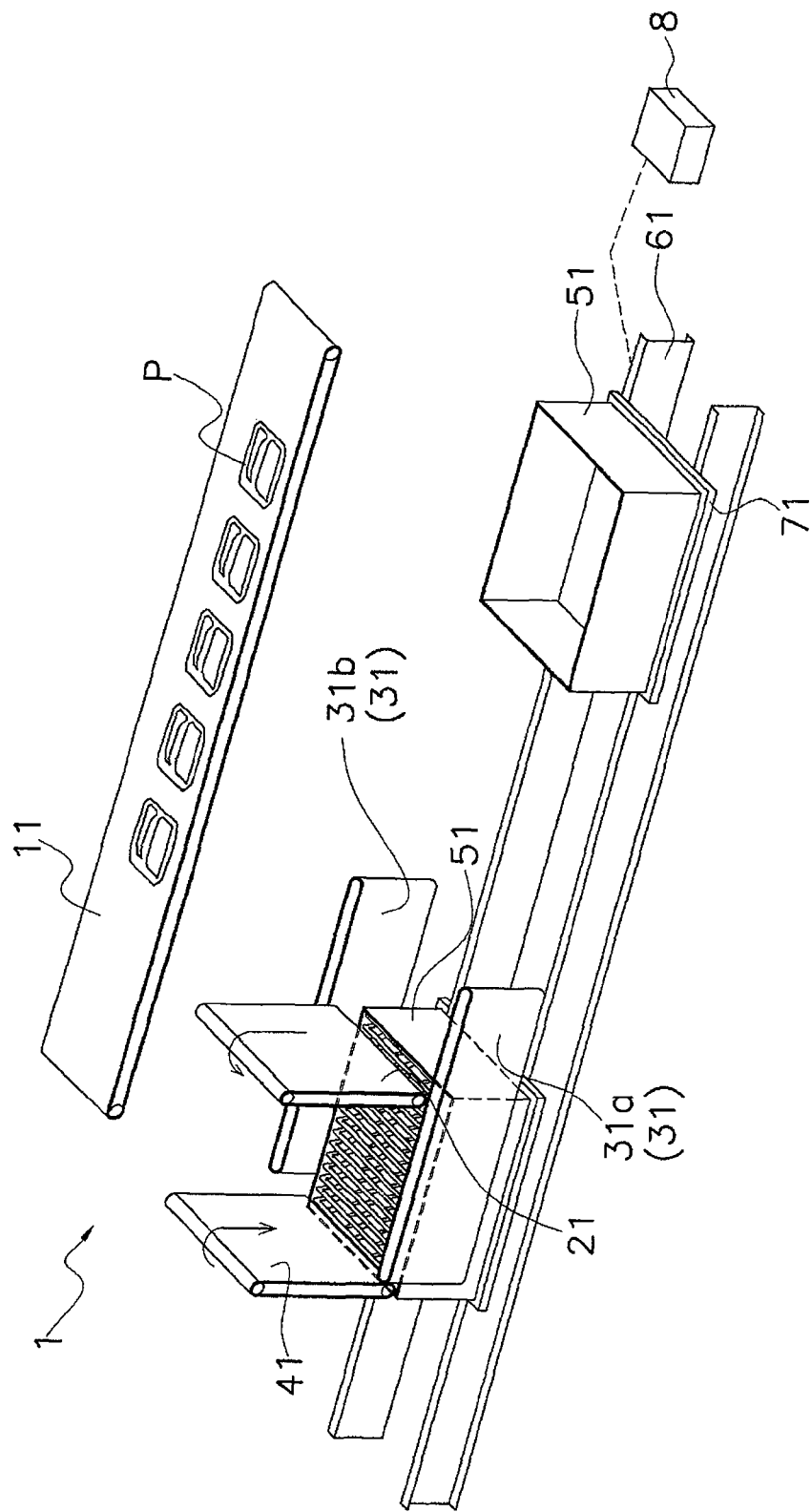
FIG. 7 is an oblique view of the boxing apparatus when the packages have been put in the box.

FIG. 6 is a side view of the boxing apparatus 1 when the third conveyor belt 31 has moved away from below the packages P, and FIG. 7 is an oblique view of the boxing apparatus 1 when the packages P have been put in the box 51. In FIGS. 6 and 7, in order to prevent the orientation of the packages P in the boxing apparatus 1 from being disrupted, the conveyance surface of the fourth conveyor belt 41 that is in contact with the front package P in the line is moved downward vertically, and at the same time the conveyance surface of the second conveyor belt 21 in contact with the last package P in the line is moved downward vertically. This allows the entire line of packages P to fall into the box below while still erect.

After this, the box 51 containing the packages P moves forward, and the second conveyor belt 21 rotates and returns. The conveyor belt 31a and the conveyor belt 31b of the third conveyor belt 31 are then rotated or tilted to return to their respective horizontal orientations.

(4) Features (4-1)

With the boxing apparatus 1, the fourth conveyor belt 41 blocks the front of the line of incoming packages P and exerts an upward force on the front package P. The front package P rises up under this upward force, and the following packages P successively rise up while riding up onto the package P ahead. Consequently, the packages P can be erected at a limited section of the third conveyor belt 31, even with individual packages P that are long in the feed direction.

(4-2)

Since the lower end of the fourth conveyor belt 41 is disposed lower than the conveyance surface of the third conveyor belt 31, no gap in the vertical direction is formed between the fourth conveyor belt 41 and the third conveyor belt 31. Therefore, the front package P in the line is prevented from being squeezed between the fourth conveyor belt 41 and the third conveyor belt 31 even if the front package P is lying horizontally.

(4-3)

The fourth conveyor belt 41 erects or uprights the front package P until it is substantially perpendicular to the horizontal plane, and the third conveyor belt 31 continues operating even after the front package P has been erected. The second package P in the line conforms to the erect state of the erected front package P while riding up onto the front package P, and subsequent packages P also rise up one after the other on the package immediately ahead under the same operation, so all of the other packages P conform to the erect state of the front package P. Therefore, disruption of the line is prevented.

(4-4)

With the boxing apparatus 1, the second conveyor belt 21, along with the fourth conveyor belt 41, holds the group of packages P in an erect state from the first to the last package in the line, and the third conveyor belt 31 opens directly under the line of packages P and then pushes the line of packages P so that they fall. Here, the second conveyor belt 21 and the fourth conveyor belt 41 move the surfaces in contact with the packages P downward. This prevents just the first and last packages P from falling below later than the other packages.

The boxing apparatus 1 is operated by a controller 8 controlling the robot (not shown) above the first conveyor belt 11, the second conveyor belt 21, the conveyor belts 31a and 31b, the fourth conveyor belt 41 and the table 71. Individual electric motors (not shown) are connected respective ones of each of robot (not shown), the first conveyor belt 11, the second conveyor belt 21, the conveyor belts 31a and 31b and the fourth conveyor belt 41 are all connected to the controller 8 for controlling direction and speed of rotation. The cylinders (hydraulic or pneumatic) that control tilting of the conveyor belt 31a and conveyor belt 31b, repositioning movement (horizontal to vertical orientation) of the second conveyor belt 21 and movement of the table 71 are also connected to the controller 80. Further, tilting of the conveyor belt 31a and conveyor belt 31b, repositioning movement of the second conveyor belt 21 and movement of the table 71, can be controlled by the controller 8 via either stepper motors or cylinders (hydraulic or pneumatic).

Second Embodiment (1) Simplified Configuration of Boxing Apparatus 101

Figure 8:
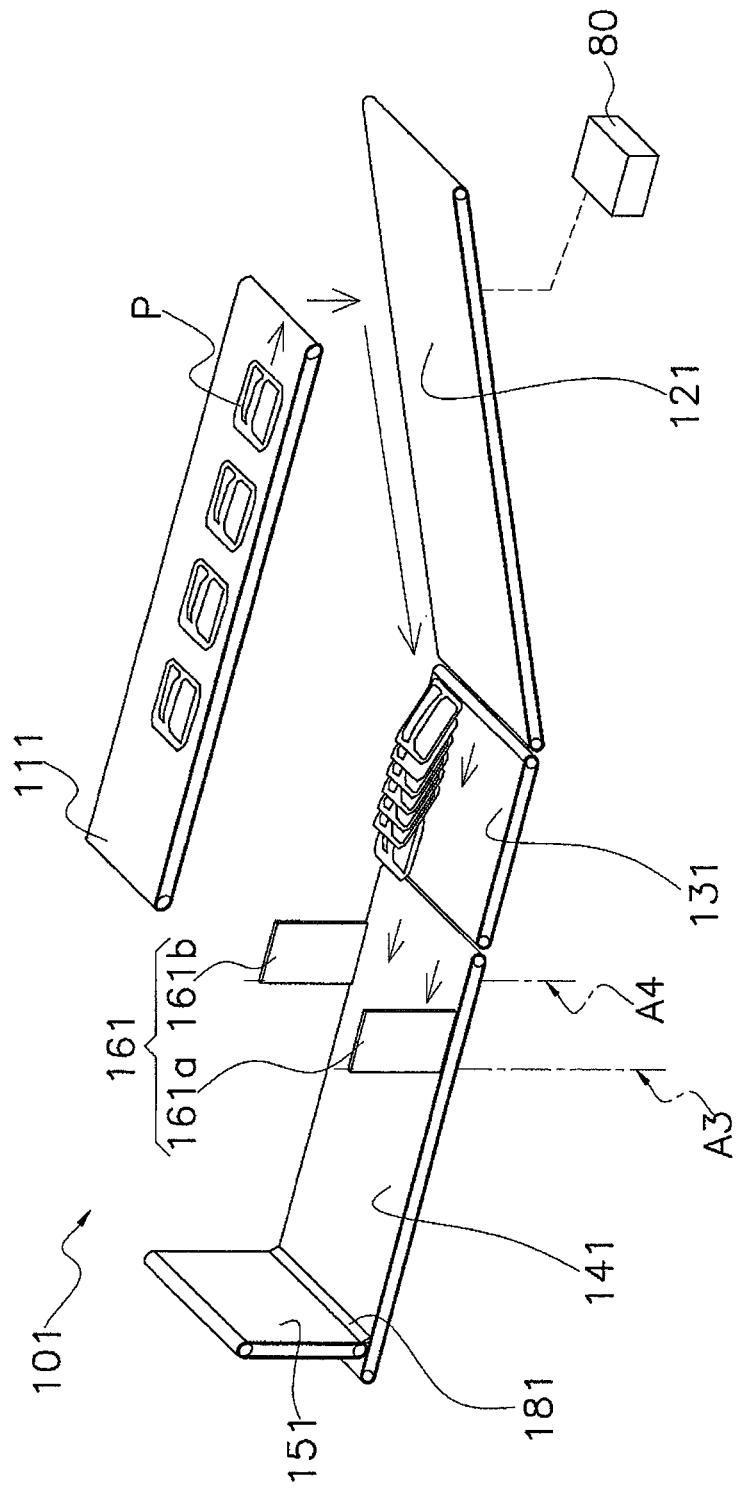
FIG. 8 is an oblique view of the boxing apparatus pertaining to a second embodiment of the present invention.

FIG. 8 is an oblique view of the boxing apparatus 101 pertaining to an embodiment of the present invention. In FIG. 8, the boxing apparatus 101 comprises a first conveyor belt 111, a second conveyor belt 121, a third conveyor belt 131, a fourth conveyor belt 141, a fifth conveyor belt 151, an opening and closing mechanism 161, and a push-out member 171 (see FIG. 13).

(2) Detailed Configuration (2-1) First Conveyor Belt 111

The first conveyor belt 111 is a horizontal conveyor belt, and is disposed above the second conveyor belt 121. Packages P that are conveyed in by the first conveyor belt 111, just as in the first embodiment, are pouch-shaped packages P filled with a specific weight of confectionery, and fall onto the conveyance surface of the second conveyor belt 121 after being conveyed a specific distance. The first conveyor belt 111 defines a package feeding conveyor.

(2-2) Second Conveyor Belt 121

The second conveyor belt 121 catches the packages P that fall from the first conveyor belt 111, and conveys them toward the third conveyor belt 131. Consequently, the second conveyor belt 121 is designed so that one end is at a position slightly lower than the height of the first conveyor belt 111, and the other end is at the height position of the third conveyor belt 131, in order to catch the packages P without hindrance as they fall from the first conveyor belt 111. In other words, the second conveyor belt 121 is inclined by a specific angle to the horizontal plane.

The packages P move over the conveyance surface of the second conveyor belt 121 in a line so that adjacent ones partially overlap each other.

(2-3) Third Conveyor Belt 131

Once the number of packages P, which form a partially overlapping line, has reached a specific number, the third conveyor belt 131 moves this line of packages P in its entirely onto the fourth conveyor belt 141. In FIG. 8, the third conveyor belt 131 is in a horizontal orientation, but it may be inclined at an angle smaller than the inclination angle of the second conveyor belt 121 to allow smoother movement from the second conveyor belt 121. The second and third conveyor belts 121 131 define a package arranging conveyor.

(2-4) Fourth Conveyor Belt 141

The fourth conveyor belt 141 is a horizontal conveyor belt, and conveys the line of packages P conveyed in from the third conveyor belt 131 toward the fifth conveyor belt 151. The opening and closing mechanism 161, which opens and closes the conveyance path, is disposed on the part of the conveyance surface of the fourth conveyor belt 141 nearest the third conveyor belt 131.

(2-5) Fifth Conveyor Belt 151

The fifth conveyor belt 151 is a vertical conveyor belt, and blocks and erects the front of the line of packages P moving in over the conveyance surface of the fourth conveyor belt 141. The fifth conveyor belt 151 defines an erecting conveyor.

Figure 9:
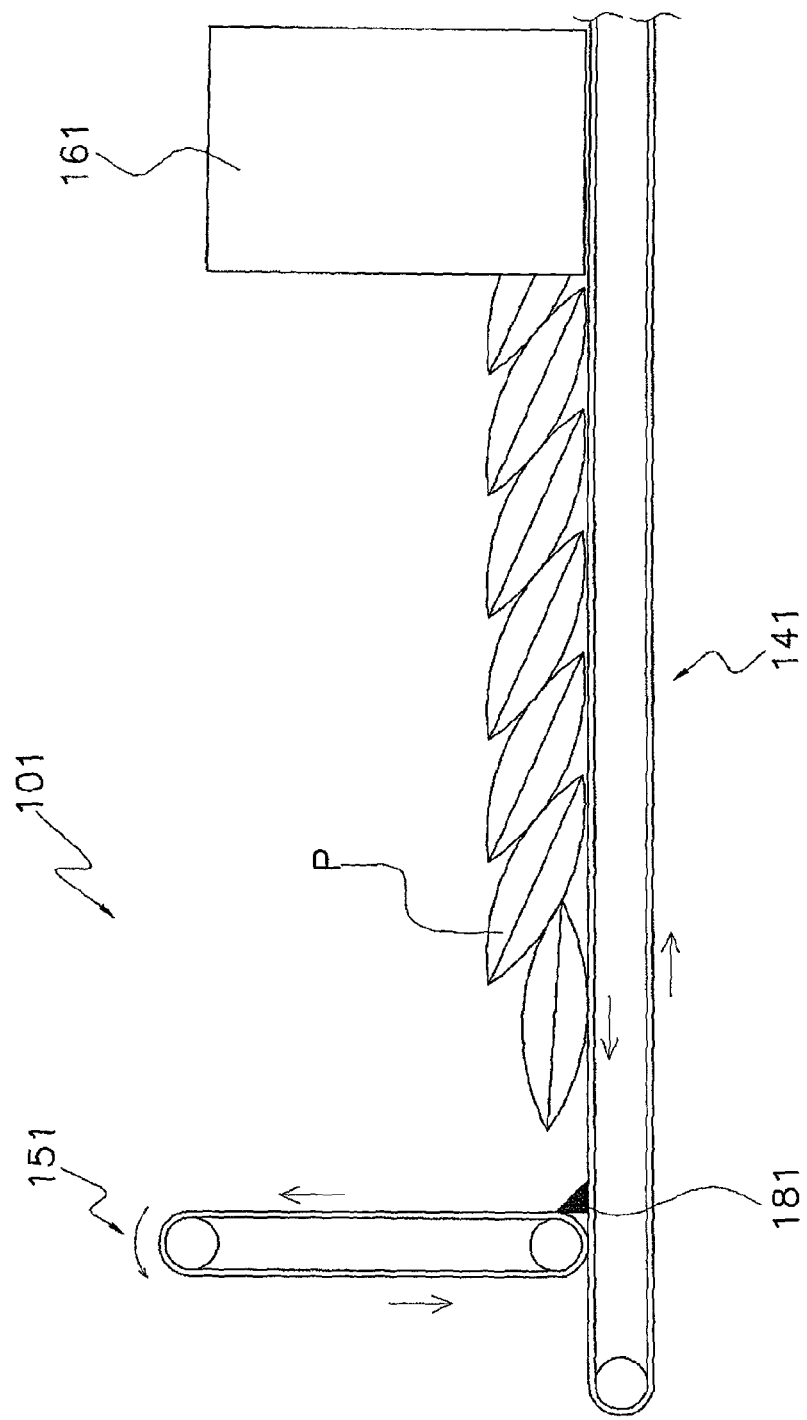
FIG. 9 is a side view of the boxing apparatus, and shows a state in which the packages are moving toward a fifth conveyor belt.
Figure 10:
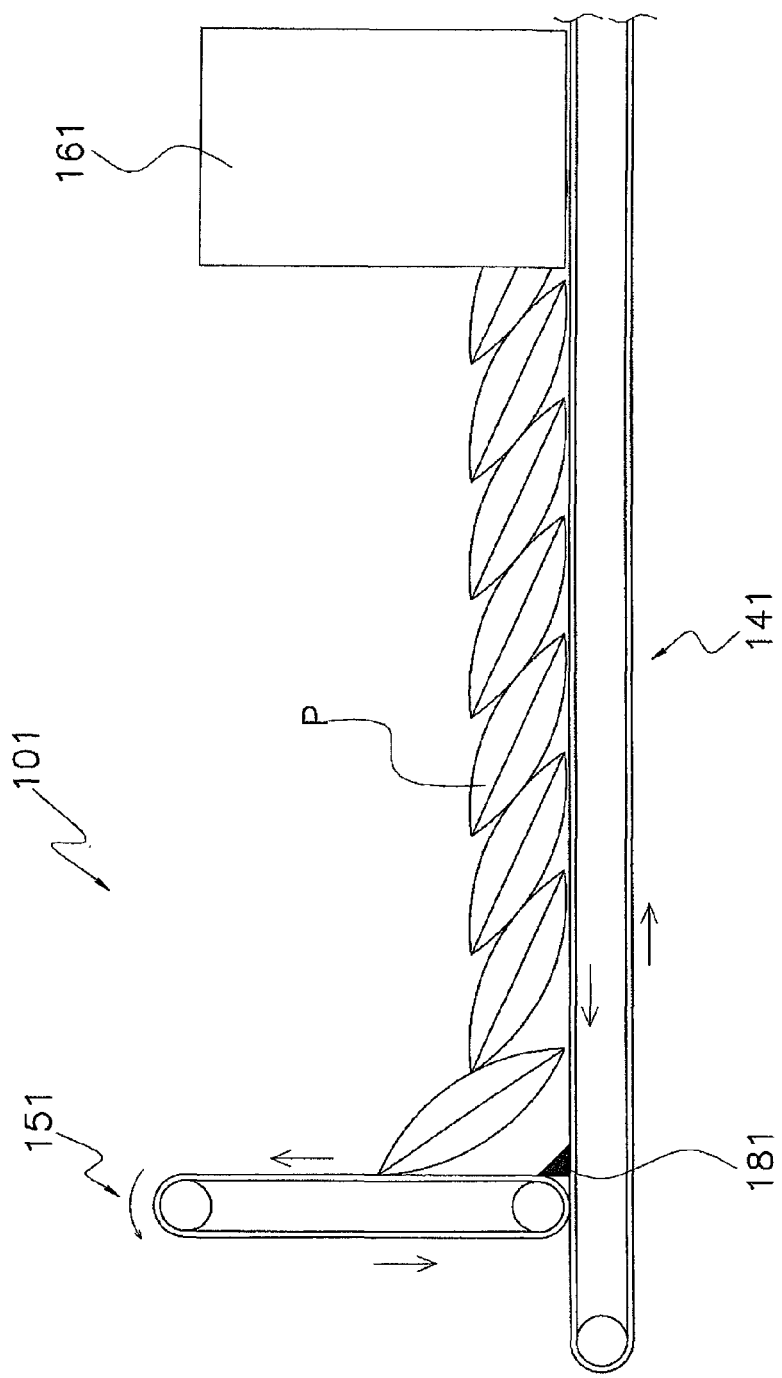
FIG. 10 is a side view of the boxing apparatus, and shows a state in which the front package has hit the fifth conveyor belt and raised up.

FIG. 9 is a side view of the boxing apparatus 101, and shows a state in which the packages P are moving toward the fifth conveyor belt 151. FIG. 10 is a side view of the boxing apparatus 101, and shows a state in which the front package P has hit the fifth conveyor belt 151 and raised up.

In FIG. 9, the front part of the second package P is resting on the rear part of the front package P, so the leading edge of the front package P is angled slightly upward from horizontal. Also, the conveyance surface of the fifth conveyor belt 151 moves vertically upward from slightly ahead of where the packages P arrive at the conveyance surface. In FIG. 10, when the leading edge of the front package P comes into contact with the conveyance surface, an upward force is exerted on the leading edge of the package P, and since the horizontal movement by the fourth conveyor belt 141 continues, the front package P can rise up reliably.

Since a wedge-shaped gap is formed between the lower end of the fifth conveyor belt 151 and the conveyance surface of the fourth conveyor belt 141, a guide member 181 that guides the leading edge of the package P upward so that this edge does not go into this gap is provided in front of the gap.

The guide member 181 is provided to the fifth conveyor belt 151, and when the guide member 181 moves simultaneously with the fifth conveyor belt 151, the gap between the guide member 181 and the conveyance surface of the fourth conveyor belt 141 is adjusted to a minimal distance at which there is only slight contact. The guide member 181 is made of a material that slides well, such as POM (polyacetal) or the like.

Therefore, even if the package P at the front of the line is lying horizontally, the front package P will be prevented from being squeezed between the conveyance surfaces of the fourth conveyor belt 141 and the fifth conveyor belt 151.

Figure 11:
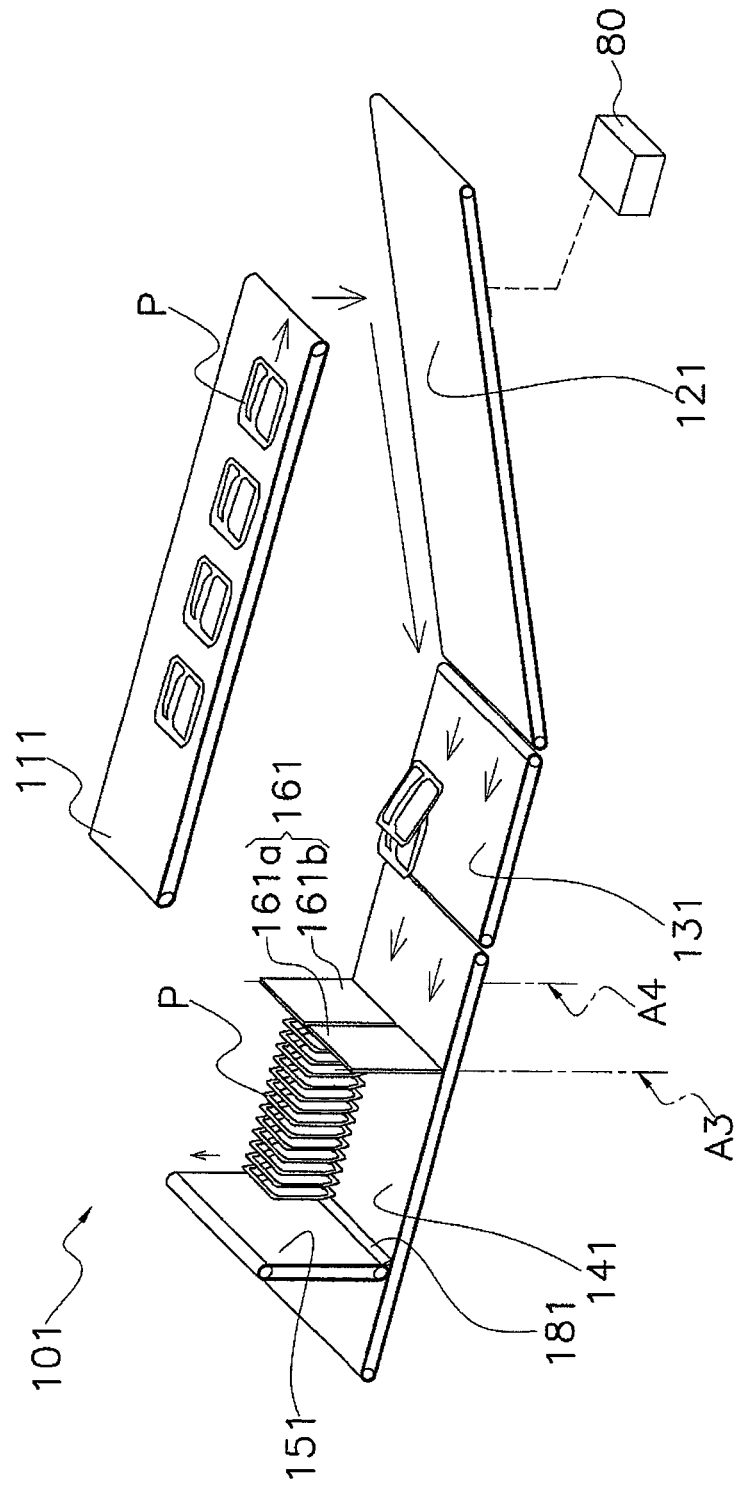
FIG. 11 is an oblique view of the boxing apparatus, and shows a state in which all of the packages in the line have been erected.
Figure 12:
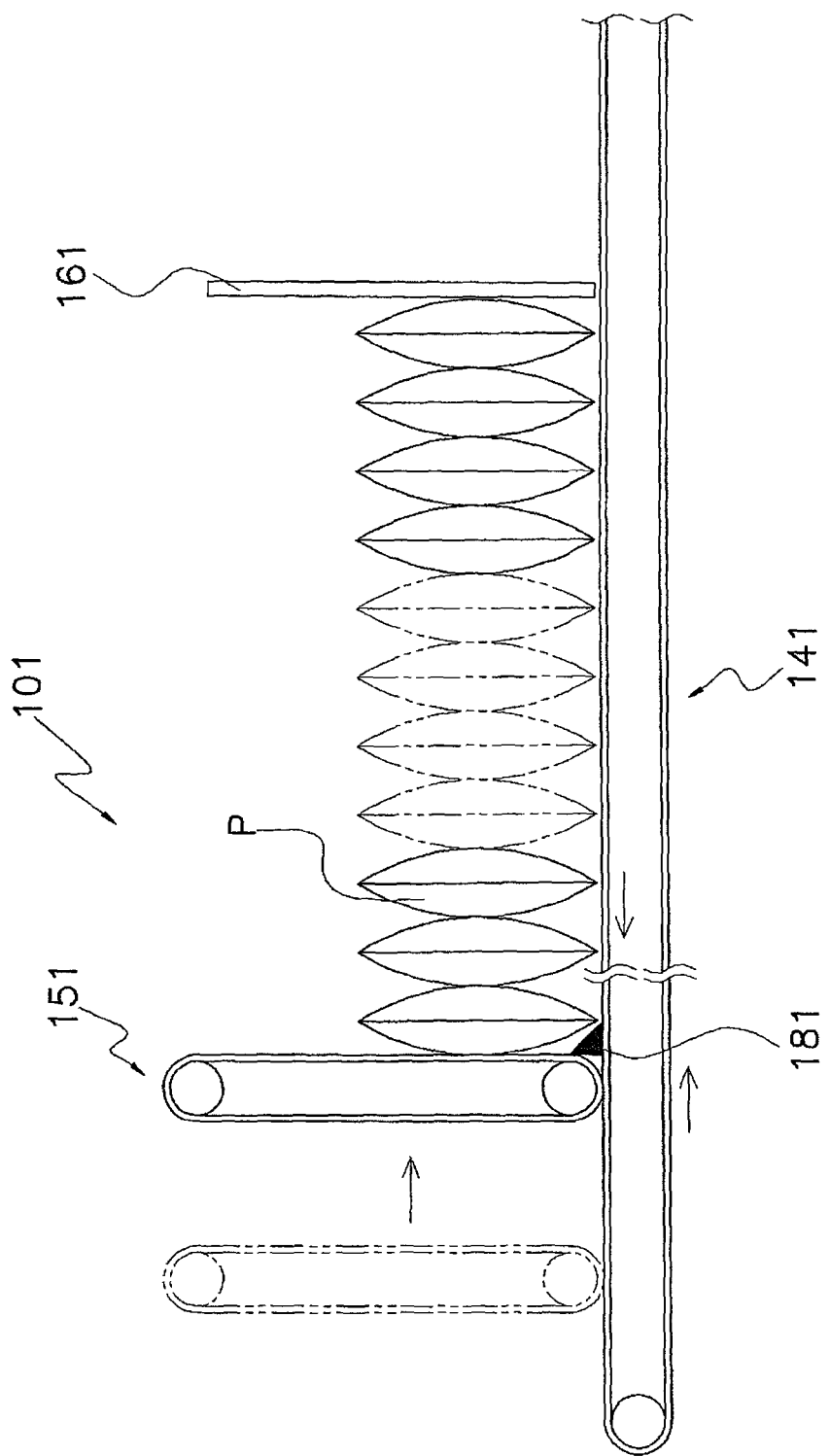
FIG. 12 is a side view of the boxing apparatus, and shows a state in which a group of packages has been erected by the fifth conveyor belt.

FIG. 11 is an oblique view of the boxing apparatus, and shows a state in which all of the packages P in the line have been erected. FIG. 12 is a side view of the boxing apparatus 101, and shows a state in which a group of packages P has been erected by the fifth conveyor belt 151. In FIGS. 11 and 12, the fifth conveyor belt 151 moves over the conveyance surface of the fourth conveyor belt 141 in the opposite direction from the conveyance direction of the packages P and sandwiches the packages P between itself and the opening and closing mechanism 161, which allows all of the packages P to be erected.

(2-6) Opening and Closing Mechanism 161

The opening and closing mechanism 161 includes a first opening and closing plate 161a, a second opening and closing plate 161b, and an actuator (not shown) that rotates these plates. The first opening and closing plate 161a and the second opening and closing plate 161b are disposed at the ends of the fourth conveyor belt 141 in the width direction, and the plate surfaces are remain parallel to the conveyance direction while the packages P are moving forward. The first opening and closing plate 161a pivots about a third axis $A_3$ and the second opening and closing plate 161b pivots about an axis $A_4$. The opening and closing mechanism 161 (and plates 161a and 161b) defines a compressing device.

In FIG. 12, when the fifth conveyor belt 151 moves in the opposite direction from the conveyance direction in order to erect the packages P, the first opening and closing plate 161a and the second opening and closing plate 161b rotate in mutually opposite directions around their vertical axes $A_3$ and $A_4$, so that the plate surfaces of the first opening and closing plate 161a and the second opening and closing plate 161b are oriented perpendicular to the conveyance direction, which blocks off the conveyance path and causes the group of packages P to be sandwiched between the opening and closing mechanism 161 and the conveyance surface of the fifth conveyor belt 151. The actuator may be selected as appropriate from among motors, solenoids, air cylinders, and the like.

(2-7) Push-Out Member 171

Figure 13:
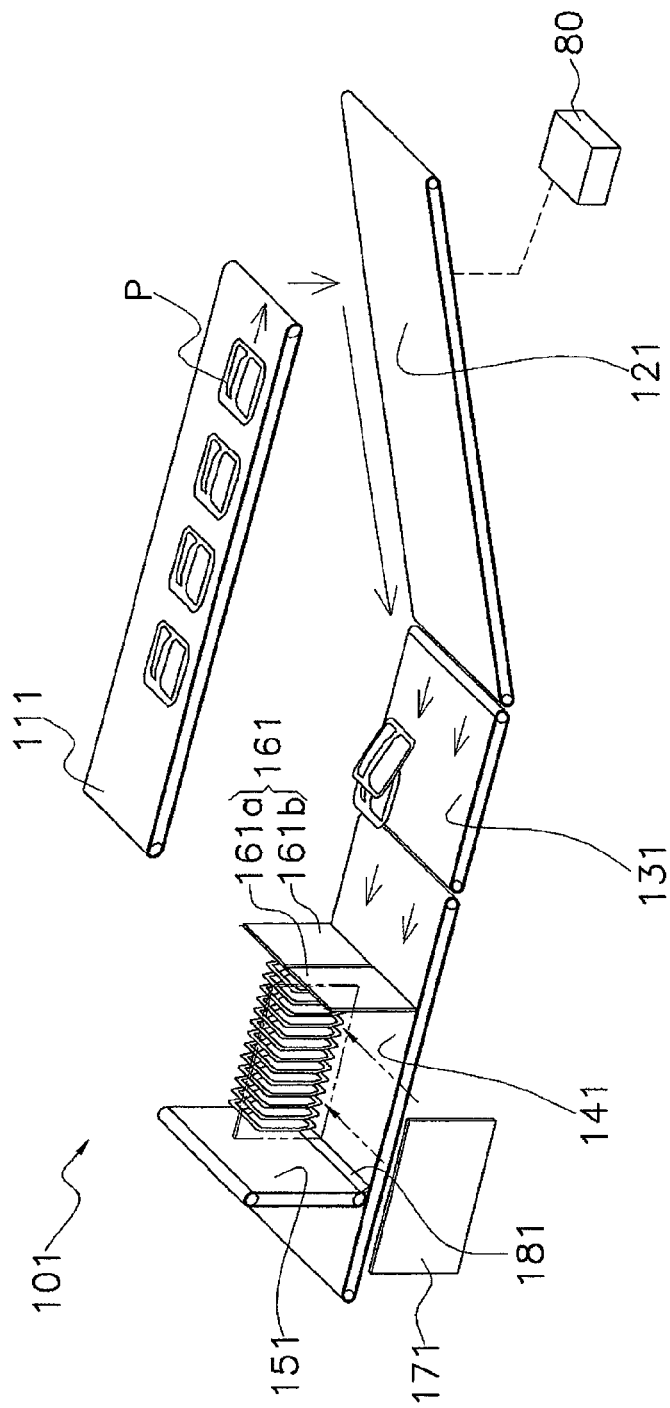
FIG. 13 is a side view of the boxing apparatus, and shows a push-out member.
Figure 14:
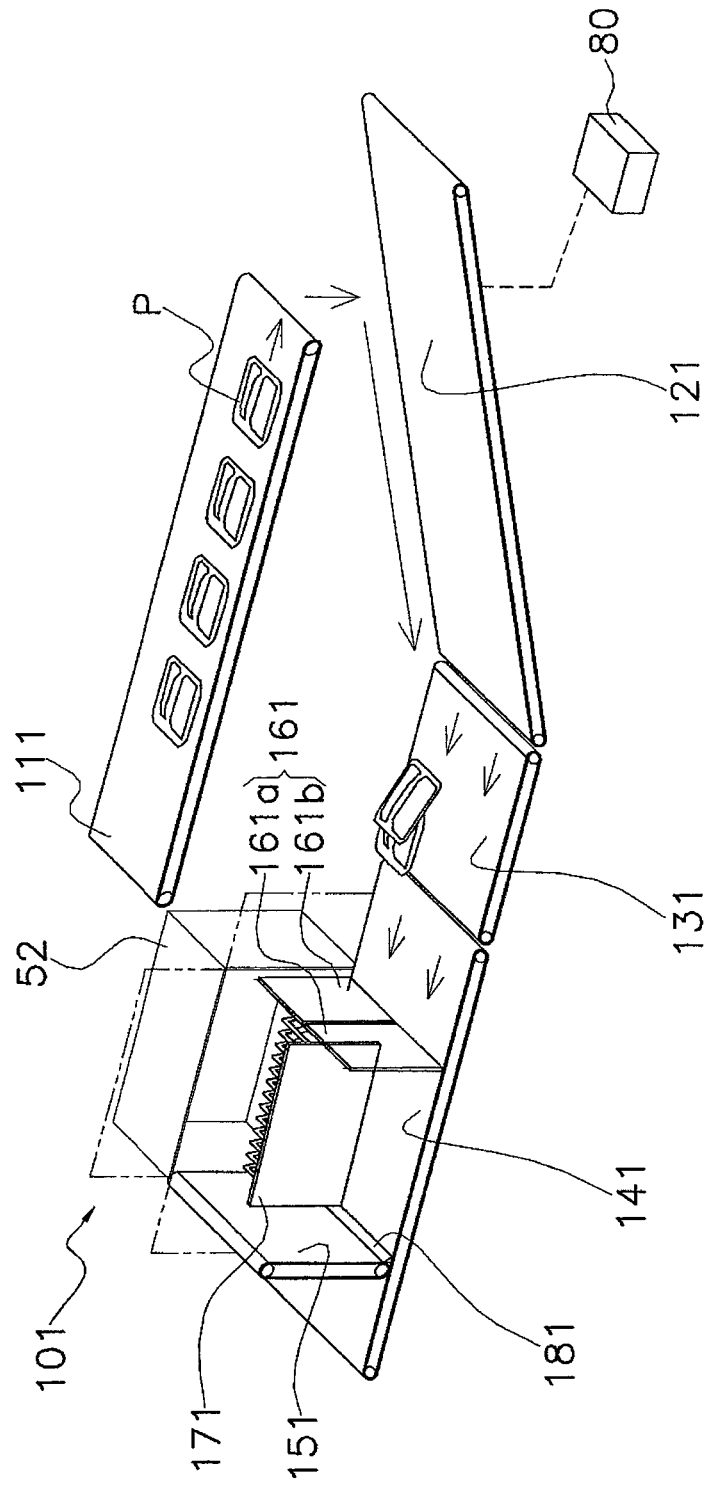
FIG. 14 is a side view of the boxing apparatus, and shows the state just before the group of erected packages is pushed out by the push-out member into a cardboard box.

FIG. 13 is a side view of the boxing apparatus 101, and shows the push-out member 171. FIG. 14 is a side view of the boxing apparatus 101, and shows the state just before the group of erected or upright packages P is pushed out by the push-out member 171 into a cardboard box.

The push-out member 171 is a plate-shaped member that pushes the packages P in a direction that is horizontal and is perpendicular to the conveyance direction, and puts the group of packages P into a waiting cardboard box in the push-out direction. The push-out member waits to the side of the fourth conveyor belt 141 or at a position that will not impede the movement of the packages P over the conveyance surface of the fourth conveyor belt 141. The driver that moves the push-out member 171 may be selected as appropriate from among motors, air cylinders, and the like.

(3) Operation of Boxing Apparatus 101

The boxing apparatus 101 is operated by the controller 80 controlling the table 71, the first conveyor belt 111, the second conveyor belt 121, the third conveyor belt 131, the fourth conveyor belt 141, the fifth conveyor belt 151, the opening and closing mechanism 161, and the push-out member 171. Individual electric motors (not shown) are connected respective ones of each of the first conveyor belt 111, the second conveyor belt 121, the third conveyor belt 131, the fourth conveyor belt 141 and the fifth conveyor belt 151 are all connected to the controller 80 for controlling direction and speed of rotation. The cylinders (hydraulic or pneumatic) that control pivoting movement of the opening and closing mechanism 161, the push-out member 171 are also connected to the controller 80. Further, movement of the opening and closing mechanism 161 can be controlled by the controller 80 via either stepper motors or cylinders (hydraulic or pneumatic).

As shown in FIGS. 8 and 9, after the packages P conveyed in over the first conveyor belt 111 arrive at the conveyance surface of the second conveyor belt 121, the spacing is successively adjusted so that the adjacent ones partially overlap, while the resulting line of packages is conveyed toward the third conveyor belt 131.

The third conveyor belt 131 maintains the line and waits until a specific number of packages P have been conveyed in from the second conveyor belt 121, the third conveyor belt 131 is actuated at the point when the specific number of packages P has been reached, and the arranged group of packages P is transferred to the conveyance surface of the fourth conveyor belt 141.

The fourth conveyor belt 141 conveys the arranged group of packages P toward the fifth conveyor belt 151. At this time, the leading edge of the front package P is angled slightly upward from the horizontal plane as the package moves forward. The conveyance surface of the fifth conveyor belt 151 here is moving upward.

The timing at which the conveyance surface of the fifth conveyor belt 151 is moved upward is when the arranged group of packages P begins to be conveyed by the fourth conveyor belt 141 toward the fifth conveyor belt 151, and the movement stops after a specific length of time. This specific length of time includes the length of time that the group of packages P moves over the fourth conveyor belt 141, and the length of time until the leading edge of the front package P hits the conveyance surface of the fifth conveyor belt 151 and rises up.

As shown in FIG. 10, when the leading edge of the front package P comes into contact with the conveyance surface of the fifth conveyor belt 151, an upward force is exerted on the leading edge, and the front package P rises up. After the front package P has risen up, movement of the conveyance surface of the fifth conveyor belt 151 is halted. As shown in FIGS. 11 and 12, the fifth conveyor belt 151 moves horizontally so as to push the packages P back in the opposite direction from the conveyance direction.

At this time, the first opening and closing plate 161a and second opening and closing plate 161b of the opening and closing mechanism 161 rotate so that the plate surfaces are perpendicular to the conveyance direction, and block off the reversal path of the group of packages P as they are pushed back, so the group of packages P is sandwiched between the conveyance surface of the fifth conveyor belt 151 and the first opening and closing plate 161a and second opening and closing plate 161b. As a result, all of the packages P are erected.

As shown in FIG. 14, a cardboard box 52 awaits to the side of the erected group of packages P, on the opposite side from the push-out member 171 and with its opening facing the group of packages P. The cardboard box 52 is supplied from a cardboard box supply apparatus (not shown) disposed above the boxing apparatus 101.

The push-out member 171 pushes the erected group of packages P toward the opening of the cardboard box 52, and puts the group of packages P into the cardboard box 52.

After the first group of packages P has been put in the cardboard box 52, the cardboard box 52 moves downward and waits for the next group of packages P to be pushed out. This operation is repeated until the cardboard box 52 is considered to be full of packages P.

(4) Features (4-1)

With the boxing apparatus 101, since the incoming group of packages P is pushed back in the opposite direction from the conveyance direction by the fifth conveyor belt 151, which is a vertical conveyor, all of the group of packages P are erected (oriented upright) at substantially the same time, which makes it easier to put them into a box.

(4-2)

With the boxing apparatus 101, since the group of packages P is sandwiched between the conveyance surface of the fifth conveyor belt 151 and the first opening and closing plate 161a and second opening and closing plate 161b, all of the group of packages P are erected (oriented upright) at substantially the same time.

(4-3)

With the boxing apparatus 101, since the point when the leading edge of the package P will hit the conveyance surface of the fifth conveyor belt 151 can be predicted, the upward movement of the conveyance surface of the fifth conveyor belt 151 can be utilized for only when needed and only for the necessary duration in order to erect the front package P.

(4-4)

With the boxing apparatus 101, the orientation of the packages P when the conveyance surface is moved, that is, whether the lengthwise direction of the packages P is parallel or perpendicular to the conveyance direction, is determined according to the orientation when the packages P are put in the cardboard box 52. The point when the leading edge of the front package P will hit the conveyance surface of the fifth conveyor belt 151 depends on whether the lengthwise direction of the packages P is parallel or perpendicular to the conveyance direction. The controller 80 can vary the duration during which the conveyance surface of the fifth conveyor belt 151 is moved upward according to the orientation of the packages P when put in the cardboard box 52, so the front package P can be reliably erected.

(4-5)

With the boxing apparatus 101, if there were no guide member 181, there would be the possibility that the leading edge of the front package P would go into a gap formed by the conveyance surface of the fifth conveyor belt 151 and the conveyance surface of the fourth conveyor belt 141, rendering the apparatus inoperable, in a state in which the leading edge of the front package P is tilted downward, or when a package whose leading edge is low in height to start with is conveyed. However, at least the leading edge of the package P can be prevented from going into the gap by blocking off the gap with the guide member 181.

INDUSTRIAL APPLICABILITY

As discussed above, with the present invention, even a line of packages that are longer in the feed direction can be erected successively on a limited conveyance surface of a horizontal conveyor belt and put into a box all at once, so the boxing apparatus is space saving and the present invention is not limited to the boxing apparatus and is also useful in equipment that successively erects objects being conveyed along a manufacturing line, and thereby assists a worker in assembly work.

The controller 80 preferably includes a microcomputer with a boxing apparatus control program that controls the various devices of the boxing apparatus, as discussed above and below. The controller 80 can also include other conventional components such as an input interface circuit, an output interface circuit, and storage devices such as a ROM (Read Only Memory) device and a RAM (Random Access Memory) device. The microcomputer of the controller 80 is programmed to control the above described boxing apparatus. The memory circuit stores processing results and control programs such as ones for positioning and boxing operations that are run by the processor circuit. The controller 80 is operatively coupled to the boxing apparatus in a conventional manner. The internal RAM of the controller 80 stores statuses of operational flags and various control data. The internal ROM of the controller 80 stores the control data for various operations. The controller 80 is capable of selectively controlling any of the components of the control system of the boxing apparatus in accordance with the control program. It will be apparent to those skilled in the art from this disclosure that the precise structure and algorithms for the controller 80 can be any combination of hardware and software that will carry out the functions of the present invention.

The various motors, hydraulic and pneumatic devices that are employed in the boxing apparatus are conventional components that are well known in the art. Since these devices are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the boxing apparatus. Accordingly, these terms, as utilized to describe the present invention should be interpreted relative to a vehicle equipped with the boxing apparatus.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

REFERENCE SIGNS LIST

1, 101 boxing apparatus
21 second conveyor belt (holding means)
31 third conveyor belt (conveyance means)
41 fourth conveyor belt (erecting means)
80 controller
151 fifth conveyor belt (erecting means)
161*a* first opening and closing plate (opening and closing member, erecting means)
161*b* second opening and closing plate (opening and closing member, erecting means)
181 guide member (blocking member, erecting means)

The invention claimed is:

1. A boxing apparatus comprising
a package feeding conveyor belt;
a package arranging conveyor belt;
an erecting conveyor belt that is fixed in a vertically orientation adjacent to a first end of the package arranging conveyor belt and separately operable relative to the package arranging conveyor belt;
a holding device that is separate from the package arranging conveyor belt, the holding device being configured to pivot between a horizontal orientation where a transport surface of the holding device is substantially at the same level as a transport surface of the package arranging conveyor belt and a vertical orientation relative to the package arranging conveyor belt, the holding device being movable while in the vertical orientation above package arranging conveyor belt from a second end of the package arranging conveyor belt toward the first end; and
a controller configured to control movement of the package feeding conveyor belt, the package arranging conveyor belt, the erecting conveyor belt and the holding device independently from one another, the controller controlling:
movement of the package feeding conveyor belt to provide a plurality of packages one by one to the package arranging conveyor belt in an inclined orientation,
movement of the package arranging conveyor belt to receive the plurality of packages in the inclined orientation and arrange the plurality of packages making a line of packages such that each following package partially overlaps a preceding package, the package feeding conveyor belt collecting a specific quantity of the plurality of packages;

movement of the erecting conveyor belt blocking movement of the first package of the line of packages, the controller further selectively moving a surface of the erecting conveyor belt in an upwardly moving direction with the first package contacting the surface such that the first package moves from an inclined orientation to an erect state and with the controller controlling movement of the package arranging conveyor belt causing remaining ones of the plurality of packages in the line of packages to move from the inclined orientation at least part way toward the erect state; and movement of the holding device from the horizontal orientation to the vertical orientation and in the vertical orientation move the holding device above and along the package arranging conveyor belt to bring a vertical surface of the holding device into contact with a last package in the line of packages prior to boxing, moving all of the packages in the line of packages to the erect state.

2. The boxing apparatus according to claim 1, wherein the controller is configured to control the erecting conveyor belt to exert an upward force on the first package until an angle of the first package relative to the horizontal plane is greater than that of the following package.

3. The boxing apparatus according to claim 1, wherein the controller is configured to continue movement of the package arranging conveyor belt even after the front package has been erected.

4. The boxing apparatus according to claim 3, wherein the package arranging conveyor belt is configured to pivot about a pivot axis that extends in a direction from the first end to the second end of the package arranging conveyor belt, the boxing apparatus further comprising:

a pivoting device that pivotally moves the package arranging conveyor belt about the pivot axis from a horizontal orientation to a vertical orientation such that the package arranging conveyor belt is spaced apart from the line of packages, wherein the holding device and the erecting conveyor belt hold the line of packages in an erect state and push the line of packages downward after the package arranging conveyor belt has moved to the position spaced apart from the line of packages.

5. The boxing apparatus according to claim 4, wherein the surface of the erecting conveyor belt and the vertical surface of the holding device contact adjacent ones of the line of packages and each move in the vertical directions, and when the packages are pushed downward, the surface of the erecting conveyor belt and the vertical surface of the holding device in contact with the adjacent ones of the packages are moved downward.

6. The boxing apparatus according to claim 1, wherein the erecting conveyor belt is a vertically conveyor belt with the surface of the erecting conveyor belt contacting the first package of the line of packages, the surface moving in a vertical direction;

the package arranging conveyor belt is a horizontal conveyor belt whose conveyance surface on which the plurality of packages are placed moves in the horizontal direction, and the lower end of the vertical conveyor belt is disposed beneath the conveyance surface of the horizontal conveyor belt.

7. A boxing apparatus comprising a package feeding conveyor belt;

a package arranging conveyor belt disposed under the package feeding conveyor belt;

an erecting conveyor belt that is fixed in a vertically orientation adjacent to a first end of the package arranging conveyor belt and separately operable relative to the package arranging conveyor belt;

a holding device which includes a first member that pivots about a first vertical axis from a position extending above the package arranging conveyor belt aligned with a direction of movement of the package arranging conveyor belt to a position above the package arranging conveyor belt but traverse with the direction of movement of the package arranging conveyor belt; and a controller configured to control movement of the package feeding conveyor belt, the package arranging conveyor belt, the erecting conveyor belt and the holding device independently from one another, the controller controlling:

movement of the package feeding conveyor belt to provide a plurality of packages one by one to the package arranging conveyor belt in an inclined orientation, movement of the package arranging conveyor belt to receive the plurality of packages in the inclined orientation and arrange the plurality of packages making a line of packages such that each following package partially overlaps a preceding package, the package feeding conveyor belt collecting a specific quantity of the plurality of packages;

movement of the erecting conveyor belt blocking movement of the first package of the line of packages, the controller further selectively moving a surface of the erecting conveyor belt in a direction exerting an upward force on first package such that the first package moves from an inclined orientation to an erect state and with the controller controlling movement of the package arranging conveyor belt causing remaining ones of the plurality of packages in the line of packages to move from the inclined orientation at least part way toward the erect state; and pivoting movement of the first member of the holding device to move a surface of the first member into contact with a last package in the line of packages prior to boxing, moving all of the packages in the line of packages to the erect state.

8. The boxing apparatus according to claim 7, wherein the controller is configured to control the erecting conveyor belt to exert an upward force on the first package until an angle of the first package relative to the horizontal plane is greater than that of the following package.

9. The boxing apparatus according to claim 7, wherein the controller is configured to continue movement of the package arranging conveyor belt even after the front package has been erected.

10. The boxing apparatus according to claim 7, wherein
the first vertical axis of the first member is located on a first side of the package arranging conveyor belt, and
the holding device further includes a second member that pivots about a second vertical axis located on a second side of the package arranging conveyor belt opposite the first side.

11. The boxing apparatus according to claim 7, wherein
the controller is configured to predict a point in time when a leading edge of the first package will contact the surface of the erecting conveyor belt, and moves the surface of the erecting conveyor belt upward for a specific duration that includes the point in time when the leading edge of the first package will contact the surface of the erecting conveyor belt.

12. The boxing apparatus according to claim 11,
wherein the controller is configured to vary the specific duration according to the orientation of the packages when put in the box.

13. The boxing apparatus according to claim 7,
wherein the erecting conveyor belt extends above a horizontal conveyance surface of the package arranging conveyor belt, and
the erecting conveyor belt further includes a blocking member that blocks off a gap defined between the erecting conveyor belt and the horizontal conveyance surface of the package arranging conveyor belt.

\* \* \* \* \*